United States Patent
Kalleh

(10) Patent No.: US 7,636,715 B2
(45) Date of Patent: Dec. 22, 2009

(54) METHOD FOR FAST LARGE SCALE DATA MINING USING LOGISTIC REGRESSION

(75) Inventor: Omid Rouhani Kalleh, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 444 days.

(21) Appl. No.: 11/690,328

(22) Filed: Mar. 23, 2007

(65) Prior Publication Data

US 2008/0235208 A1 Sep. 25, 2008

(51) Int. Cl.
G06F 17/30 (2006.01)
G06F 7/00 (2006.01)
(52) U.S. Cl. ................. 707/5; 707/3; 707/100
(58) Field of Classification Search ........ 707/1–5, 707/7, 101, 100
See application file for complete search history.

(56) References Cited

U.S. PATENT DOCUMENTS

| | | | |
|---|---|---|---|
| 6,212,526 B1 | 4/2001 | Chaudhuri et al. | 707/102 |
| 6,278,997 B1 | 8/2001 | Agrawal et al. | 707/6 |
| 6,374,251 B1 | 4/2002 | Fayyad et al. | 707/101 |
| 6,388,592 B1 | 5/2002 | Natarajan | 341/107 |
| 6,988,108 B2 | 1/2006 | Bernhardt et al. | 707/102 |
| 7,152,065 B2 | 12/2006 | Behrens et al. | 707/5 |
| 2003/0088565 A1 | 5/2003 | Walter et al. | 707/6 |
| 2006/0136462 A1 | 6/2006 | Campos et al. | 707/102 |

OTHER PUBLICATIONS

Komarek, P. R. et al., "Fast Robust Logistic Regression for Large Sparse Datasets with Binary Outputs", http://research.microsoft.com/conferences, 8 pages.
Rousseeuw, P. J. et al., "Computing LTS Regression for Large Data Sets", http://www/geo.upm.es, 21 pages.
Shafer, J. et al., "SPRINT: A Scalable Parallel Classifier for Data Mining", *Proceedings of the 22nd VLDB Conference*, 1996, http://www/sigmod.org, 544-555.
Smyth, P., "Data Mining: Data Analysis on a Grand Scale", Technical Report UCI-ICS 00-20, Information and Computer Science, Jul. 6, 2000, http://www/datalab.uci.edu/papers, 21 pages.

*Primary Examiner*—Mohammad Ali
*Assistant Examiner*—Kannan Shanmugasundaram
(74) *Attorney, Agent, or Firm*—Woodcock Washburn LLP

(57) ABSTRACT

A classifier using a logistic regression technique permits previously acquired search results to be used to perform a new search. A user inputs search terms and queries a database of previous search results. A logistical regression calculation is performed using sets of data such that the time execution performance is at least a factor of 10 improvement over a conventional technique. In our experiments where real world data was used, the execution time was reduced up to 353 times as compared to the conventional technique. The Iteratively Reweighted Least Squares (IRLS) method is used for the logistical regression method and beta vector values are calculated from the database data set. A vector of the user input terms is multiplied by the beta vector values to produce an ordered list of documents satisfying the user search terms.

16 Claims, 5 Drawing Sheets

Input:
Matrix $X$, vector $y = y^{(m)}$ (corresponding to class m) and ridge regression scalar parameter $\lambda$.

Output:
Logistic Regression weights $\beta = \beta^{(m)}$ (corresponding to class m).

$\beta = 0$

WHILE(termination criteria is not met)

$$\mu_i = \frac{1}{1 + e^{-X_{[i]} * \beta}} \quad (1.a)$$

$$W_{i,i} = \mu_i * (1 - \mu_i) \quad (1.b)$$

$$U_i = X_i * \beta + \frac{(y_i - \mu_i)}{W_{i,i}} \quad (1.c)$$

$$A = X^T * W * X + \lambda * I \quad (1.d)$$

$$b = X^T * W * U \quad (1.e)$$

Solve $\beta$ from $A * \beta = b$ \quad (1.f)

END

Fig. 1

The Iteratively Reweighted Least Squares (IRLS) Method

```
Input:
   Diagonal matrix W. Set S = {S_1, ..., S_d}.
   Scalar constant λ.
Output:
   Symmetric A A'_{i,j} = 0, for all i and j.
FOR q = 1 TO d
   FOREACH (i,j) IN S_q
      A'_{i,j} = A'_{i,j} + W_{q,q}
      A'_{j,i} = A'_{j,i} + W_{q,q}
   END
END DEFINE A S.T.
A_{i,j} = A'_{i,j} + λ,    if i=j
A_{i,j} = A'_{i,j},        if i≠j
```

Fig. 2A

Algorithm to calculate A using set S.

```
Input:
   Matrix X.
Output:
   Set S = {S_1, ..., S_d}

S_q = Empty set, for all q.
FOR i = 1 TO d
   FOR j = i TO d
      FOREACH q WHERE
              (X_{q,i} = 1 OR X_{q,j} = 1)
         IF (X_{q,i} = 1 AND X_{q,j} = 1)
            S_q = S_q UNION {(i,j)}
         END
      END
   END
END
```

Fig. 2B

Algorithm to calculate set S.

METHOD FOR FAST LARGE SCALE DATA MINING USING LOGISTIC REGRESSION

BACKGROUND

Data mining is the process of automatically searching large volumes of data for patterns using tools such as classifiers. Data mining using a classifier involves sorting through large amounts of data and picking out relevant information. One technique known in the art is the use of logistic regression. Logistic regression is a mathematical technique that has never obtained full acceptance in the data mining community as a standard machine learning technique for large data sets. The reluctance to use logistic regression is largely due to the general belief that logistic regression is too computationally expensive and that it will not easily scale up to large data sets. Thus, some logistic regression techniques for classifier use are not well favored. A need exists to implement a classifier that uses logistic regression techniques and executes in a manner that is not prohibitive to realistic use.

SUMMARY

In one aspect of the invention, a classifier can be built which uses the Iteratively Reweighted Least Squares (IRLS) method of logistics regression. The IRLS method is very slow in execution and a novel use of a logistic regression-set (LR-Set) technique for executing the IRLS method is presented. The LR-Set technique is tested to perform roughly one to two orders of magnitude faster than a base algorithm that also performs the IRLS method. The LR-Set technique offers an execution time that is proportional to $d*k*k+i_{max}*a^2$ whereas the base technique executes in a time proportional to $d*k*a+i_{max}*a^2$ where: d is the number of data points in the database, and is on the order of 1,000,000 data points; k is the average number of nonzero elements per row in an X matrix of elements in the database, and is on the order of 10; a is the number of attributes or columns of the X matrix derived from a database, and is on the order of 10K to 1 million attributes; and $i_{max}$ is a constant, and is on the order of 10. The time execution result of the LR-Set technique over the base technique provides such an improvement in time savings. Using the present LR-Set technique, the IRLS technique can be rationally used in a matter of hours, whereas before, the IRLS technique would require months to execute.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

In the drawings:

FIG. 1 is a description of the Iteratively Reweighted Least Squares (IRLS) method;

FIG. 2A is an algorithm that uses set S to calculate A of FIG. 1;

FIG. 2B is an algorithm that uses calculates Set S of FIG. 2A;

DETAILED DESCRIPTION

Exemplary Embodiments

Figure 3:
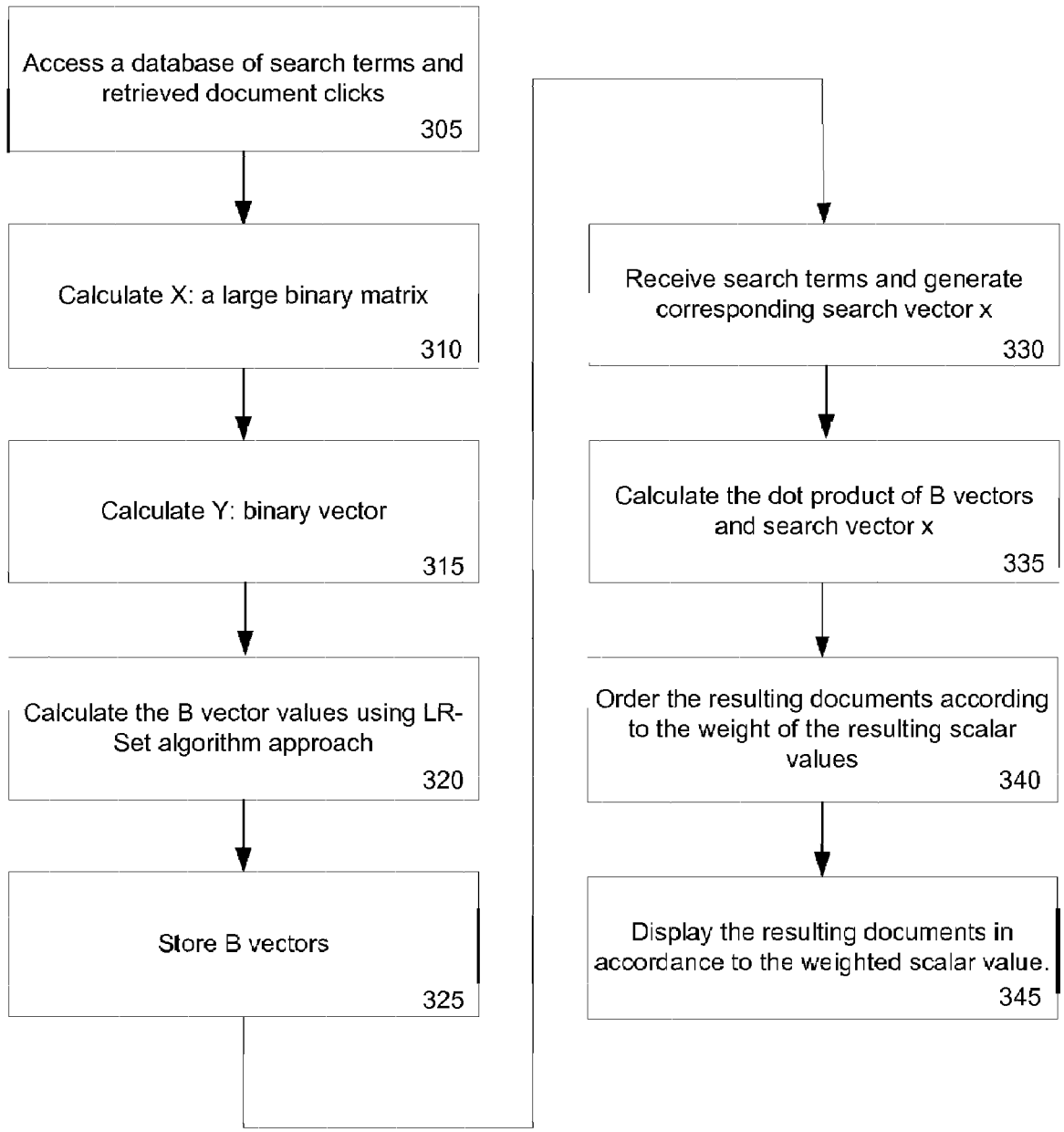
FIG. 3 is an example flow diagram depicting a method according to the present invention.

Most search engines today examine the content of a first document in a database in order to associate relevant keywords. Once the keywords or search terms are found in the first document, the first document tagged to be listed on a results page and the next document in the database is examined for the relevant keywords. Once all of the documents in a database are examined, then the list of relevant documents are ordered according to a ranking algorithm and presented to a user. The user can then select or click-through the documents of interest to select the most relevant document for his search purposes. Generally, the first few documents that the user clicks to select are most relevant to his search.

In another method of conducting a search, the content of the documents themselves are not searched. Instead, the list of keywords of the user searches and the relevant documents that were selected by the user (click-through) are stored in a database. It is this large list of keywords and relevant documents selected by the user corresponding to the keyword search results that are searched. This method of searching involves a classifier that is able to search through a large set of keywords and the corresponding relevant documents to produce a result that utilizes previously performed, assumed successful full document searches.

Classifiers utilize a wide variety to techniques to perform this database search of keywords and user click-through data. One known algorithm is a logistic regression (LR) type classifier. One specific algorithm is the Iteratively Reweighted Least- Squares (IRLS) method. The IRLS method is shown in FIG. 1. The IRLS method of FIG. 1 includes six steps; steps 1.a through 1.f. The derivation of this method is known to those of skill in the art. In one aspect of the invention, a novel algorithm is used to implement an IRLS-based classifier that can search a database of user click-through data. Background for this algorithm is provided in a white paper entitled "Algorithms for Large Scale Data Mining Using Logistic Regression" written by the inventor of the current application and provided to the IEEE Symposium on Computational Intelligence and Data Mining held on Apr. 1-5, 2007. This inventor-authored white paper is incorporated by reference in its entirety into the present specification. The novel algorithm of the white paper addresses a multi-class scenario where database data points can belong to three or more classes (c>2), which execute the IRLS method once for each class. The challenge in implementing the IRLS method of FIG. 1 is to perform the method with computational efficiency so as to reduce the execution time involved. The present invention addresses that challenge.

The two most computationally expensive lines in the IRLS method are (1.d) and (1.f) as represented in FIG. 1. The LR-Set method will significantly improve the execution time of step (1.d), and as a result, make the entire IRLS algorithm execute in a fraction of the time it would require without the LR-Set method. In order to fully appreciate the comparative execution times of different approaches to an implementation of the IRLS algorithm, an approach to a comparison of the executable complexity is desirable. A framework for this complexity comparison is given in Table 1.

The notation for a time complexity is as follows:

TABLE 1

Time Complexity Notation

| Variable | Denotes |
|---|---|
| a | Number of attributes (columns in X) |
| d | Number of data points (rows in X) |
| s | Number of nonzero elements in matrix X divided with total number of elements in X |
| c | Number of classes |
| $i_{max}$ | Maximum number of iterations for the CG method |
| k | Average number of nonzero elements per row in X (k = s * a) |

Although most of the equations in the IRLS method can efficiently be implemented using straightforward implementations, the time complexity for equation (1.d) is not straightforward. However, as developed in above-mentioned white paper entitled "Algorithms for Large Scale Data Mining Using Logistic Regression" written by the inventor of the current application, the complexity of a straightforward implementation of the IRLS method may be written in standard Big O notation, where, in computer science, it is useful in the analysis of the complexity of algorithms. Referring to FIG. 1, the Big O time complexity for each step is given as follows:

step 1.a corresponds to a time complexity of d*k;

step 1.b: corresponds to a time complexity of d;

step 1.c: corresponds to a time complexity of d*k;

step 1.d: corresponds to a time complexity of k*a*d;

step 1.e: corresponds to a time complexity of d*k; and step 1.f: corresponds to a time complexity of $i_{max}*a^2$.

Using the "Big O" notation, the above steps summarize like this:

$$O(d*k+d+d*k+k*a*d+d*k+i_{max}*a^2)=O(k*a*d+i_{max}*a^2)$$

Note that the "d" term and the "d*k" terms disappear since they are both smaller than "d*k*k" which is left in the final expression. Thus, the time complexity for the standard straightforward implementation of the IRLS method has a time complexity of:

$$O(k*a*d+i_{max}*a^2)\text{(Time complexity of standard IRLS method)}.$$

In one aspect of the invention, the IRLS method may be implemented with a method called Logistic Regression-Set or LR-Set. Using the LR-Set, the form of equation (1.d) in FIG. 1 is used to obtain a better time complexity than that of a straightforward or base implementation. Using LR-Set, equation (1.d) is replaced such that, instead of actually calculating $A=X^T*W*X+\lambda*I$, a new data structure is provided that allows the computation of A in O(k*k*d) time, instead of O(k*a*d) time, which is what the base implementation algorithm offers. The $\lambda*I$ factor does not affect the total time complexity, so a focus on how to calculate $A=X^T*W*X$ is examined. The fastest way to calculate this equation for a sparse matrix X and diagonal matrix W is O(k*a*d) as indicated above. However, if the multiplication is to be performed many times, and X is constant and only W changes, one can pre-calculate how the final matrix A will appear and use this to quickly recalculate A for each new W. To summarize the Big O time complexity comparison, the time complexity of IRLS with the new LR-Set technique is:

$$O(d*k*k+i_{max}*a^2).$$

While the time complexity of IRLS using the standard technique is:

$$O(d*k*a+i_{max}*a^2).$$

Note that the "$i_{max}*a^2$" is the same in both expressions but, in the improved LR-Set technique, the time complexity is improved from "k*a*d" to be "d*k*k".

When calculating the dot product <X(i),X(j)>, a traversal of all nonzero elements occurs in X(i) and X(j). However, most of this traversal is unnecessary since most of the multiplications will be with 0. The formula to calculate A can be written as:

$$A_{i,j}=\Sigma \text{ from } q=1 \text{ to } d \text{ of } X_{q,j}*X_{q,i}*W_{q,q}.$$

X(i) is the i'th column in matrix X. This is different from the FIG. 1 term of X[i] which is the i'th row in matrix X.

Note that when X is sparse, most of the terms above will be 0. Even with a sparse implementation of X, traversal is through all positions where either $X_{q,i}$ or $X_{q,j}$ are nonzero. It's enough for only one of the terms to be zero in order for the entire expression $X_{q,j}*X_{q,i}$ to become zero.

The solution to this is to create d sets of tuples defined as $S_q=\{(i,j):X_{q,j}=1 \char`\^ X_{q,i}=1$, for all i, for all j, where $i \leq j\}$. For easier notation, the set of these sets will be referred to as S where $S=\{S_q:1 \leq q \leq d\}$. To calculate A, the algorithm of FIG. 2A is used. The usage of A' and A helps to create A without explicitly adding $\lambda$ to all diagonal elements $A_{i,i}$. This lowers the time complexity from O(d*k*k+a) to O(d*k*k). The time complexity to calculate A will be in the order of the total number of elements in the S sets. To calculate S, the algorithm of FIG. 2B is used. There is one element for every i and j such that $X_{q,i}=1$ and $X_{q,j}=1$. The proof that gives the size complexity of set S will be significantly reduced assuming that the ones in the X matrix are distributed so that each row of the matrix X has equally many ones. With the provided notation, this means that each row of X contains k=s*a nonzero elements. The probability that $X_{q,i}$ is 1 is k/a. The probability that both $X_{q,i}$ is 1 and $X_{q,j}$ is 1 when i≠j is: k/a*(k−1)/(a−1).

Vector X(i) consist of d elements, so the expected number of nonzero terms that will be added when calculating <X(i), X(j)> is d*k/a*(k−1)/(a−1). To calculate $X^T* X$, <X(i),X(j)> is calculated for (a*(a−1))/2 different combinations of i and j where i<j. So in total this gives d*k/a*(k−1)/(a−1)*(a*(a−1))/2 elements in the S sets. Using worst case notation, a rewrite is O(d*k*k), which is significantly better than O(d*k*a), especially for large data sets where the number of attributes is very large. To summarize the LR-Set algorithm, one uses the fact that calculating $X^T*X$ requires a large number of multiplications with 0. One can pre-calculate the set $S=\{S_1, \ldots, S_d\}$ such that each element in set $S_q$ corresponds to a vector pair X(i) and X(j) where both element $X_{q,i}$ and $X_{q,j}$ are ones.

A full comparison of the straightforward or base algorithm and the new LR-set algorithm that implements the IRLS method is instructive to appreciate the decrease in complexity of the new LR-Set algorithm of the current invention. As discussed in the above mentioned white paper, the time complexity of the Base algorithm and the LR-Set algorithm are very different when executed with c classes and they are shown below in Table 2:

TABLE 2

Time Complexity Comparison

| | Time Complexity |
|---|---|
| Base algorithm | $c * i_{max} * a^2 + c * d * k * a$ |
| LR-Set | $c * i_{max} * a^2 + c * d * k * k + d * k * a$ |

As mentioned above, the time complexity for step (1.d) in FIG. 1 using the LR-Set technique is improved over the standard technique from "k*a*d" to be "d*k*k" thus, a time complexity O(k*k*d) for the LR-Set technique means that the time it takes to execute that step is proportional to "k*k*d". Accordingly, if the variable d is made twice as big, then the algorithm takes twice as long to execute. On the other hand, if the variable k were made twice as big, it will take four times longer to execute step (1.d) for the IRLS algorithm. According to the above table, the straightforward or base algorithm technique has the complexity of $c*i_{max}*a^2 + c*d*k*a$, whereas the LR-Set technique has a time complexity of $c*i_{max}*a^2 + c*d*k*k + d*k*a$. Comparing the two, one of skill in the art notices that the first part of the expression $(c*i_{max}*a\ a^2)$ is identical. Removing the identical terms produces:

Base algorithm: c*d*k*a=d*k(c*a)

LR-Set: c*d*k*k+d*k*a=d*k(c*k+a)

Since both expressions have "d*k", the difference is:

Base algorithm: c*a

LR-Set: c*k+a

In implementation, variables "a" and "c" are very large numbers (in the order of 100,000), while "k" is a small constant (in the order of 10). Multiplication of "a" and "c" produces a very large number (a*c). Hence the Base algorithm takes a very long time to compute. However, the calculation of "c*k+a" in the LR-Set algorithm produces a much smaller number. Hence LR-Set is much more execution time efficient which is a benefit of the present invention.

Test cases for the use of the LR-Set algorithm are fully discussed in the in above-mentioned white paper entitled "Algorithms for Large Scale Data Mining Using Logistic Regression" authored by the inventor. The key improvement in execution time using the LR-Set technique for the execution of the IRLS method allows indexing many more documents than what was previously possible. In one example presented in the above mentioned white paper, the IRLS method using the straightforward base technique was executed in 1449 seconds. The execution time for the IRLS method using the LR-Set technique resulted in a 4.48 second execution time. Thus the LR-Set technique executes roughly 323 times as fast as the base technique. Using another data set, the LR-Set technique resulted in an improvement of speed of a factor of 42. These dataset results represents an improvement in execution speed of one to two orders of magnitude.

In the first dataset example, a search of 3840 documents, representing a real-world data set, would take 4.48*3840=17203.2 seconds=4.78 hours in total to calculate all 3840 beta_X values using the LR-Set Algorithm. In comparison, the straightforward base algorithm would take 1449*3840=5564160 seconds=2.15 months to calculate the same beta vectors. It would, of course, not be possible in practice to wait 2.15 months, but waiting 4.78 hours is much more reasonable. Thus, in practical terms, a classifier using logistic regression would not be practical to build without the use of the LR-Set technique for implementation of the IRLS algorithm.

A simple example of the use of the LR-Set technique of implementing an execution for the IRLS method is provided below. Assume a document that contains the word "firewall", for example, is likely to show up when someone searches for the term "firewall". The search engine proposed here on the other hand does not need to analyze the content of the documents it will be able to search. Instead it will look on previous searches (user click-throughs) conducted by users to find documents the users found helpful, and then learn how to map the keyword that have previously been used to find those documents. For example, if someone previously has searched for "firewall virus protection" and clicked on the firewall document, the LR-Set based search engine will learn that each of the words ("firewall", "virus" and "protection") are related to the firewall document, even if the specific words "virus" and "protection" perhaps doesn't even exist in the actual document. When a new user searches for "virus protection", the firewall document can be shown using the LR-Set technique, although none of the users keywords existed in the document presented to him.

A process can be used to map the actual data to the mathematical equations associated with the LR-Set technique for executing the IRLS algorithm. Initially, X and Y variables need to be created and mapped as inputs to the LR-Set algorithm. To create the X and Y variables, a large database of user click-through data that contains information about what people have searched for in the past is used. An illustration for this example may be found in a database and is as follows:

| Search Keywords | Result |
|---|---|
| Firewall | Document 1 |
| Change, Font, Color | Document 2 |
| Firewall, Virus, Protection | Document 1 |
| Format, Table | Document 3 |

The database consists of 4 user searches and the users have clicked on 3 different documents. Mapping both keywords and documents to integer numbers yields.

| Keyword | Keyword integer representation |
|---|---|
| Firewall | 1 |
| Change | 2 |
| Font | 3 |
| Color | 4 |
| Virus | 5 |
| Protection | 6 |
| Format | 7 |
| Table | 8 |

| Document | Document integer representation |
|---|---|
| Document 1 | 1 |
| Document 2 | 2 |
| Document 3 | 3 |

Numerically, the database can now be seen as:

1 ➔ 1

2, 3, 4 ➔ 2

1, 5, 6 ➔ 1

7, 8 ➔ 3

This example database is used to generate the X matrix and Y vector that is used in the LR-Set technique. The "database" consists of 4 rows, 3 different documents and 8 different keywords, so the X matrix would hence consist of 4 rows; one for each row in our database, and 8 columns; one for each keyword. The Y vector would contain 4 elements; one for each row in the database. Each element in the Y vector represents what document the user has clicked on, so in the example:

$$Y = \begin{pmatrix} 1 \\ 2 \\ 1 \\ 3 \end{pmatrix}$$

The Y vector is useful in binary form. Accordingly, for the above example, the three y vectors correspond to:

$Y_1=(1\ 0\ 1\ 0)$, $Y_2=(0\ 1\ 0\ 0)$, and $Y_3=(0\ 0\ 0\ 1)$.

Each row of the X matrix corresponds to one row in the database, and the value of each column corresponds to if that particular keyword was used (with a value of 1) or not used (with a value of 0).

So in the example:

$$X = \begin{pmatrix} 1 & 0 & 0 & 0 & 0 & 0 & 0 & 0 \\ 0 & 1 & 1 & 1 & 0 & 0 & 0 & 0 \\ 1 & 0 & 0 & 0 & 1 & 1 & 0 & 0 \\ 0 & 0 & 0 & 0 & 0 & 0 & 1 & 1 \end{pmatrix}$$

Since the X matrix will be very large and mainly consist of zeros and just a few ones, it is implemented as a sparse binary matrix. This is a requirement for the LR-Set technique of executing the IRLS algorithm. The LR-Set technique is able to build the example classifier (search engine). Using the example above the LR-Set-based search engine will be searching among 3 different documents; document 1, 2 and 3 above. This corresponds to c=3 using the notation developed above for time complexity. In other real-world examples, c will take on values in the order of 100,000, representing large numbers of documents in a database. This can represent a large number of help documents.

Referring to the Table 1 notation, the "a" variable is the number of columns in the X matrix, or in other words, the number of keywords that are recognized. There are 8 in our example above, but in reality, a number of the order of 100,000 to 1,000,000 may be typical. The variable "k" on the other hand is very small and represents the maximum number of keywords a user places into the search. In the example above, it happens to be 3, since there are 3 words in the query, such as "change font color" or "firewall virus protection". In reality, a greater number may be used for "k", such as 10. This is a relatively small number compared to the other variables. The variable "d" is the number of data points in the database, or rows in our database. There are 4 in our example above. In reality, "d" might be of the order of 1,000,000 or more. The variable "$i_{max}$" is also a small fixed constant, and in practice, it may have a value of around 20. So to summarize, "a", "c" and "d" are very large variables (>100,000), while "k" and "$i_{max}$" are small (~10) valued variables.

Referring to the time complexity expressions of Table 2, the two expressions both have the "$c*i_{max}*a^2$" term. But the base algorithm has a term "c*d*k*a" which is significantly larger than both the "c*d*k*k" term and the "d*k*a" term occurring in the LR-Set algorithm. The first term is "a/k" times smaller, (i.e. having a value of about 10,000 times smaller) than the "c*d*k*a" term, while the other term is "c" times smaller (i.e. about 100,000 times smaller). Thus, with a large "c" values, the "c*d*k*a" term becomes too big to be practical to calculate with today's standard computers. However, the LR-Set algorithm can solve the same problem in time complexity "c*d*k*k+d*k*a" which is easily realizable even for very large "c" values.

Returning to the example, the X matrix and the Y vector can be generated from the example database data and the LR-Set algorithm can be calculated in a reasonable time. β vectors, or "B" vectors are generated next. The β vectors are the output of the well known Iteratively Reweighted Least Square (IRLS) method as described in FIG. 1. There are "c" number of B vectors to calculate, each one corresponding to a document. In the above example, there are 3 B vectors.

Initially, all beta X (X=1, 2, 3) will be set to zero-vectors. The IRLS method of FIG. 1 is executed one time to calculate beta_1. Beta_1 now have non-zero values. We run the same method (IRLS) two more times to get beta_2 and beta_3. Now all beta_X values have properly calculated values and the classifier is essential built. Now, the classifier can be used to perform a search. Note that in total, the IRLS method is executed 3 times given 3 documents. The number of documents provided in the database is "c" in the time complexity equations. The variable "c" may be considered as the number of "classes".

Notice that the IRLS method takes 3 input variables: X, y and "lambda". Lambda is just a constant scalar. This lambda value can be hard coded into a computer program and does not change with different data sets. The X matrix is a large binary matrix and represents the actual data. X is constant every time the IRLS method is run. In the example above, it is run three times. The Y vector will have different values, so the B values calculated will be different. Because the IRLS method is run with 3 different "Y" values, then three different "beta_X" values are generated.

To perform a search using the classifier, a user enters in keywords or search terms and the terms of the user query are mapped to a binary vector with the same size as the B vector. Assume the user searches for "Firewall protection". Using the example that would lead to a search vector "z" as follows:

$$z = \begin{pmatrix} 1 \\ 0 \\ 0 \\ 0 \\ 0 \\ 1 \\ 0 \\ 0 \end{pmatrix}$$

Here, a direct mapping from the keywords that the user searches to the z vector is performed. The user searched for "firewall protection", which is two words ("firewall" and "protection"). "Firewall" maps to "1" and "protection" maps to "6" as assigned above. The first and sixth values are ones, and all other values are zeros. Every time a user provides a new query, a new z query or search vector is generated on the fly.

To continue the example, having the B vectors and the z search vector, the dot product of z and each B vector will produce a scalar result. There will be "c" numbers of scalar values. In the example, there are 3 scalar vectors values. The highest such value corresponds to the document that will rank at the very top of the search results. The second highest value corresponds to the document will rank at the second place in the search ranking. And so on.

The process described in the example above may be implemented on a computer having access to a database of keyword or search terms and relevant documents. Such a data base may be built prior to execution of any search performed by a user. FIG. 3 depicts a flow diagram of a method 300 of using the LR-Set technique of the present invention in performing a search of a database having keywords and documents corresponding to those keywords. Initially, a database of search terms or keywords and corresponding user document selections of click-through selections is accessed in step 305.

The X matrix is a large binary matrix and is calculated at step 310 using the accessed database. Each row of the X matrix corresponds to one row of the database, and the value of each column corresponds to the use of that particular keyword. The Y vector is a binary vector calculated in step 315. Each element in the Y vector represents a document reference in the database which indicates that a user selected as a result of a previous search. The previous search that helped produce the database entry may be assumed to be a full text search of the document in question. Step 320 involves the calculation of the respective B vectors corresponding to the X and Y vectors. In step 325, the B vectors are stored in memory.

To this point, the calculation of the B vectors for the database may be pre-calculated and stored in memory awaiting use by a user who wishes to perform a search. Thus, steps 305 through 325 need not be performed directly in close time proximity with steps 330 through 345. Next, search terms or keywords are received in step 330 that represent query inputs from a user. The search terms are placed in a search or query vector z. The dot product of the B vectors and the z search term vector is calculated in step 335. The result of this dot product of B vectors and z search vectors produces a weighted scalar values that indicate the relevance of the search terms to the documents in the database. The scalar values can then be used to arrange the relevant documents in some logical order for display to the user in step 345.

The flow of operations depicting method 300 in FIG. 3 may be implemented on one or more computers. In one embodiment, the steps of FIG. 3 are implemented in computer instructions, which when executed perform method 300. The result of method 300 is a display of a weighted or an ordered listing of documents corresponding the user's keywords or query. The display can be any tangible form including a visual display using either electronically driven means, such as a CRT, plasma, led matrix, or other electronic display or displayed using a printed display, such as a paper output. In an alternative or additional embodiment, the tangible result is a data file that can be used as an input to a subsequent process.

As an aspect of the invention, a computer-readable medium, such as, but not limited to, magnetic storage devices, optical devices, such as CD and DVD media may be used to store computer program instructions which can implement methods discussed or suggested herein. Such computer media are envisioned to retain executable instructions for use on a general purpose computer to enable it to practice aspects of the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Exemplary Computing Device

Figure 4:
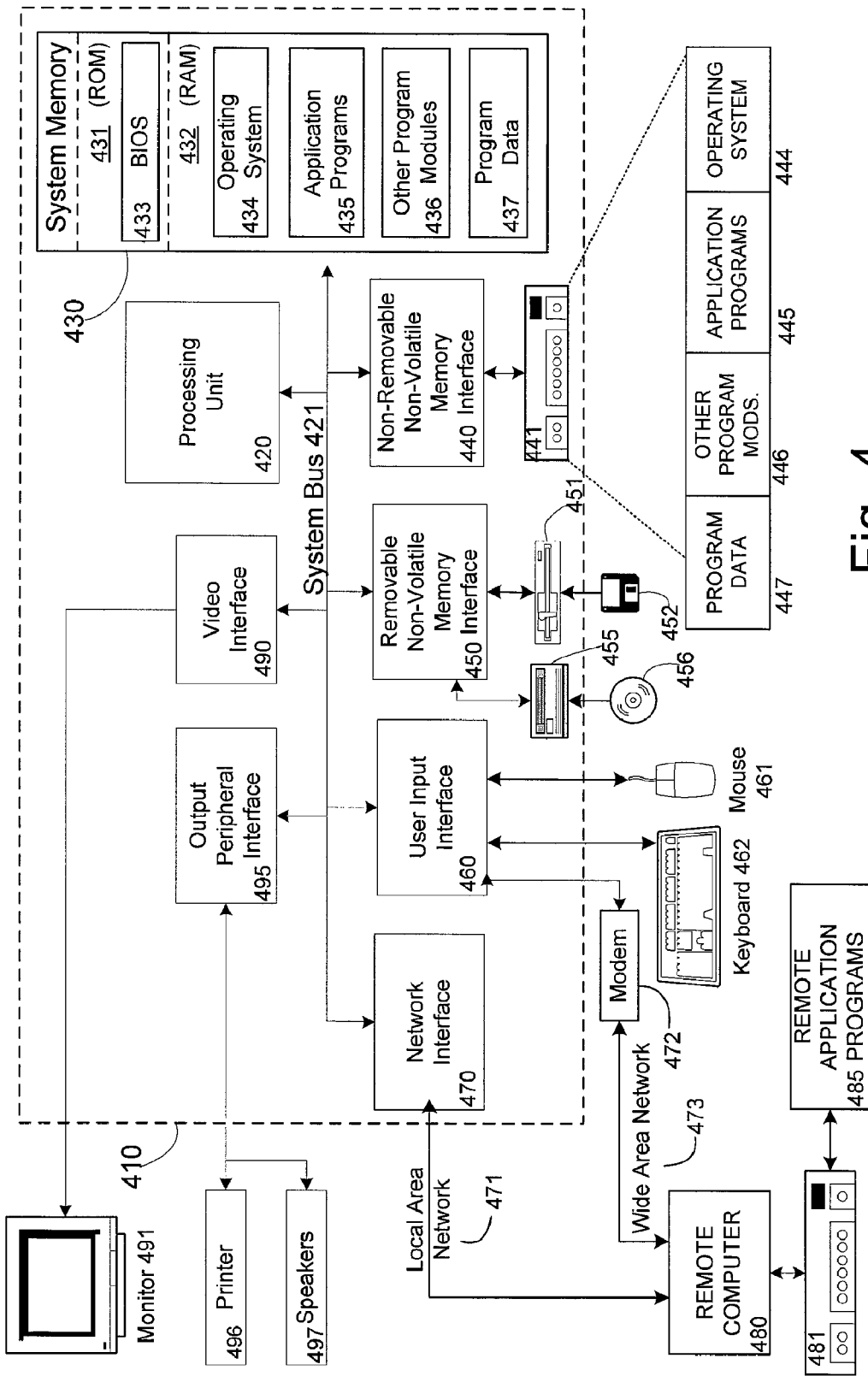
FIG. 4 is a block diagram showing an example host computing environment in which aspects of the invention may be implemented.

FIG. 4 and the following discussion are intended to provide a brief general description of a host computer suitable for interfacing with the media storage device. While a general purpose computer is described below, this is but one single processor example, and embodiments of the host computer with multiple processors may be implemented with other computing devices, such as a client having network/bus interoperability and interaction.

Although not required, embodiments of the invention can also be implemented via an operating system, for use by a developer of services for a device or object, and/or included within application software. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that various embodiments of the invention may be practiced with other computer configurations. Other well known computing systems, environments, and/or configurations that may be suitable for use include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. Embodiments of the invention may also be practiced in distributed computing environments where tasks are performed by remote processing devices that are linked through a communications network/bus or other data transmission medium. In a distributed computing environment, program modules may be located in both local and remote computer storage media including memory storage devices and client nodes may in turn behave as server nodes.

With reference to FIG. 4, an exemplary system for implementing an example host computer includes a general purpose computing device in the form of a computer system 410. Components of computer system 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures.

Computer system 410 typically includes a variety of computer readable media. Computer readable media can be any available media that can be accessed by computer system 410 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, Random Access Memory (RAM), Read Only Memory (ROM), Electrically Erasable Programmable Read Only Memory (EE- PROM), flash memory or other memory technology, Compact Disk Read Only Memory (CDROM), compact disc-rewritable (CDRW), digital versatile disks (DVD) or other optical disk storage, magnetic cassettes, magnetic tape, magnetic disk storage or other magnetic storage devices, or any other medium which can be used to store the desired information and which can accessed by computer system 410.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer system 410, such as during start-up, is typically stored in ROM 431. RAM 432 typically contains data and/or program modules that are immediately accessible to and/or presently being operated on by processing unit 420. By way of example, and not limitation, FIG. 4 illustrates operating system 433, application programs 435, other program modules 436, and program data 437.

The computer system 410 may also include other removable/non-removable, volatile/nonvolatile computer storage media. By way of example only, FIG. 4 illustrates a hard disk drive 431 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456, such as a CD ROM, CDRW, DVD, or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 4 provide storage of computer readable instructions, data structures, program modules and other data for the computer system 410. In FIG. 4, for example, hard disk drive 441 is illustrated as storing operating system 444, application programs 445, other program modules 446, and program data 447. Note that these components can either be the same as or different from operating system 444, application programs 445, other program modules 446, and program data 447. Operating system 444, application programs 445, other program modules 446, and program data 447 are given different numbers here to illustrate that, at a minimum, they are different copies.

A user may enter commands and information into the computer system 410 through input devices such as a keyboard 462 and pointing device 461, commonly referred to as a mouse, trackball or touch pad. Other input devices (not shown) may include a microphone, joystick, game pad, satellite dish, scanner, or the like. These and other input devices are often connected to the processing unit 420 through a user input interface 460 that is coupled to the system bus 421, but may be connected by other interface and bus structures, such as a parallel port, game port or a universal serial bus (USB). A monitor 491 or other type of display device is also connected to the system bus 421 via an interface, such as a video interface 490, which may in turn communicate with video memory (not shown). In addition to monitor 491, computer systems may also include other peripheral output devices such as speakers 497 and printer 496, which may be connected through an output peripheral interface 495.

The computer system 410 may operate in a networked or distributed environment using logical connections to one or more remote computers, such as a remote computer 480. The remote computer 480 may be a personal computer, a server, a router, a network PC, a peer device or other common network node, and typically includes many or all of the elements described above relative to the computer system 410, although only a memory storage device 481 has been illustrated in FIG. 4. The logical connections depicted in FIG. 4 include a local area network (LAN) 471 and a wide area network (WAN) 473, but may also include other networks/buses. Such networking environments are commonplace in homes, offices, enterprise-wide computer networks, intranets and the Internet.

When used in a LAN networking environment, the computer system 410 is connected to the LAN 471 through a network interface or adapter 470. When used in a WAN networking environment, the computer system 410 typically includes a modem 472 or other means for establishing communications over the WAN 473, such as the Internet. The modem 472, which may be internal or external, may be connected to the system bus 421 via the user input interface 460, or other appropriate mechanism. In a networked environment, program modules depicted relative to the computer system 410, or portions thereof, may be stored in the remote memory storage device. By way of example, and not limitation, FIG. 4 illustrates remote application programs 485 as residing on memory device 481. It will be appreciated that the network connections shown are exemplary and other means of establishing a communications link between the computers may be used.

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s .NET™ platform, available from MICROSOFT Corporation, includes servers, building-block services, such as Web-based data storage, and downloadable device software. While exemplary embodiments herein are described in connection with software residing on a computing device, one or more portions of an embodiment of the invention may also be implemented via an operating system, application programming interface (API) or a "middle man" object between any of a coprocessor, a display device and a requesting object, such that operation may be performed by, supported in or accessed via all of .NET™'s languages and services, and in other distributed computing frameworks as well.

As mentioned above, while exemplary embodiments of the invention have been described in connection with various computing devices and network architectures, the underlying concepts may be applied to any computing device or system in which it is desirable to implement a method for performing logistic regressions in a time efficient manner. Thus, the methods and systems described in connection with embodiments of the present invention may be applied to a variety of applications and devices. While exemplary programming languages, names and examples are chosen herein as representative of various choices, these languages, names and examples are not intended to be limiting. One of ordinary skill in the art will appreciate that there are numerous ways of providing object code that achieves the same, similar or equivalent systems and methods achieved by embodiments of the invention.

The various techniques described herein may be implemented in connection with hardware or software or, where appropriate, with a combination of both. Thus, the methods and apparatus of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention.

While aspects of the present invention has been described in connection with the preferred embodiments of the various figures, it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Therefore, the claimed invention should not be limited to any single embodiment, but rather should be construed in breadth and scope in accordance with the appended claims.

What is claimed:

1. A computer-implemented method of using previously acquired search results to perform a new search using a computer, the method comprising:
    accessing a database of search terms and user selection clicks on retrieved documents;
    calculating a matrix X, wherein matrix X is defined as a matrix having rows corresponding to rows of the database and columns corresponding to search terms in the database row;
    calculating a vector Y, wherein Y is defined as a representation of a document chosen by a user corresponding to a row of the database; calculating B vector values using the X matrix, the Y vector, and an iteratively reweighted least squares (IRLS) method, where the IRLS method executes in a time proportional to a time complexity function of $O(d*k*k+i_{max}*a^2)$, where k is the average number of nonzero elements per row in X, d is the number of data point rows in X, a is the number of columns in X and $i_{max}$ is a constant;
    storing the B vectors;
    receiving a new set of search terms and generating a corresponding search vector z;
    calculating the dot product of B and z to produce weighted scalar values of relevant documents in the database; and
    ordering the relevant documents in the database using the weighted scalar values; and
    displaying, on a computer monitor, an ordered list of the relevant documents corresponding to the new set of search terms;
    wherein the X matrix is a binary matrix wherein a value of 1 represents that a particular keyword was used; and
    wherein the Y vector comprises a binary vector wherein a 1 value represents that a particular document was selected by a user.

2. The method of claim 1, wherein one Y vector is calculated for every row represented in the database.

3. The method of claim 2, wherein calculating the B vector further comprises calculating one B vector for every Y vector that is calculated.

4. The method of claim 1, wherein the calculation of the B vector executes at least one order of magnitude in time faster than a standard base algorithm.

5. The method of claim 1, wherein storing the B vectors represents pre-calculating the B vectors so that the B Vectors are available for access after a user enters keywords to perform a search.

6. The method of claim 1, wherein the display is one of an electronically driven display and a printed display.

7. The method of claim 1, further comprising providing the ordered list of the relevant documents to a subsequent process.

8. In a system comprising a database of keywords and corresponding related documents and computer that uses a logistic regression algorithm to search the database using user keywords, the improvement comprising:
    a processor for calculating B vector values using an X matrix, a Y vector, and an iteratively reweighted least squares (IRLS) algorithm, wherein the X matrix is defined as a matrix having rows corresponding to rows of the database and columns corresponding to search terms in the database rows, wherein the Y vector is defined as a representation of a document chosen by a user corresponding to a row of the database, and where the IRLS method executes in a time proportional to a time complexity function of $O(d*k*k+i_{max}*a^2)$, where k is the average number of nonzero elements per row in X, d is the number of data point rows in X, a is the number of columns in X and $i_{max}$ is a constant;
    storage means for storing the B vectors for use in association with a new user query;
    an input interface for receiving a new set of search terms and generating a corresponding search vector z;
    the processor also calculating weighted scalar values of relevant documents in the database in response to the query; and ordering the relevant documents in the database using the weighted scalar values for display to the user; and
    wherein the X matrix is a binary matrix wherein a value of 1 represents that a particular keyword was used, and wherein the Y vector comprises a binary vector wherein a 1 value represents that a particular document was selected by a user.

9. The system of claim 8, wherein calculating the B vectors further comprises calculating one B vector for every Y vector that is calculated.

10. The system of claim 8, wherein calculating B vectors is performed in a manner that executes at least one order of magnitude in time faster than using a standard base algorithm for B vector calculation.

11. The system of claim 8, further comprising a display device for displaying the weighted scalar values to the user.

12. A computer-readable storage medium having computer-executable instructions for performing a search of a database of keywords and relevant documents, the computer-executable instructions comprising:
    calculating a matrix X, wherein matrix X is defined as a matrix having rows corresponding to rows of the database and columns corresponding to search terms in the database row;
    calculating a vector Y, wherein Y is defined as a representation of a document chosen by a user corresponding to a row of the database;
    calculating and storing B vector values using the X matrix, the Y vector, and an iteratively reweighted least squares (IRLS) algorithm, where the IRLS method executes in a time proportional to a time complexity function of $O(d*k*k+i_{max}*a^2)$, where k is the average number of nonzero elements per row in X, d is the number of data point rows in X, a is the number of columns in X and $i_{max}$ is a constant;

receiving a new set of search terms and generating a corresponding search vector z;

multiplying B and z to produce weighted scalar values of relevant documents in the database; and arranging the relevant documents in the database in an order using the weighted scalar values;

wherein the instructions further comprise assigning a value of 1 to represent that a particular keyword was used in the X matrix and assigning a value of 1 to represent that a particular document was selected by a user in the Y vector.

13. The computer-readable medium of claim 12, wherein the instructions further comprise driving a display to present to the user the weighted scalar values of the relevant documents.

14. The computer-readable medium of claim 12, further comprising an instruction to calculate one Y vector for every row represented in the database.

15. The computer-readable medium of claim 14, further comprising an instruction to calculate one B vector for every Y vector that is calculated.

16. The computer-readable medium of claim 12, wherein instructions for calculating B vector values execute at least one order of magnitude faster in time than instructions for calculating b vector values using a standard base algorithm.

* * * * *